United States Patent
Tian et al.

(10) Patent No.: US 11,933,767 B2
(45) Date of Patent: Mar. 19, 2024

(54) MICROTEXTURE REGION CHARACTERIZATION SYSTEMS AND METHODS

(71) Applicants: RTX CORPORATION, Farmington, CT (US); Iowa State University Research Foundation, Inc., Ames, IA (US)

(72) Inventors: Yong Tian, Avon, CT (US); Ronald Roberts, Ames, IA (US); Dan Barnard, Ames, IA (US)

(73) Assignees: RTX CORPORATION, Farmington, CT (US); IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

(21) Appl. No.: 17/902,609

(22) Filed: Sep. 2, 2022

(65) Prior Publication Data
US 2023/0003694 A1 Jan. 5, 2023

Related U.S. Application Data

(62) Division of application No. 16/818,946, filed on Mar. 13, 2020, now Pat. No. 11,467,133.
(Continued)

(51) Int. Cl.
*G01N 29/44* (2006.01)
*G01N 29/04* (2006.01)
(Continued)

(52) U.S. Cl.
CPC ....... *G01N 29/4445* (2013.01); *G01N 29/043* (2013.01); *G01N 29/07* (2013.01);
(Continued)

(58) Field of Classification Search
CPC ............. G01N 29/4445; G01N 29/043; G01N 29/4427; G01N 29/50; G01N 2291/0289
See application file for complete search history.

(56) References Cited

U.S. PATENT DOCUMENTS

| | | |
|---|---|---|
| 4,899,589 A | 2/1990 | Thompson et al. |
| 5,195,372 A | 3/1993 | Fushimi |
| | (Continued) | |

FOREIGN PATENT DOCUMENTS

| | | |
|---|---|---|
| EP | 1850126 | 10/2007 |
| JP | 2000275224 | 10/2000 |
| WO | 2009004829 | 1/2009 |

OTHER PUBLICATIONS

Lobkis et al., "Characterization of polycrystals with elongated duplex microstructure by inversion of ultrasonic backscattering data" Appl. Phys. Lett. 96, 161905 (2010) (Year: 2010).*
(Continued)

*Primary Examiner* — John C Kuan
(74) *Attorney, Agent, or Firm* — SNELL & WILMER L.L.P.

(57) ABSTRACT

The present disclosure provides methods and systems for the characterization of a potential microtexture region (MTR) of a sample, component, or the like. The methods may include determining a threshold width of spatial correlation coefficient and/or a threshold spatial correlation coefficient slope for an actual MTR, characterizing a potential MTR as an actual MTR or a defect, characterizing an actual MTR as an acceptable MTR or not, and/or characterizing various components with potential MTRs as defective or not. The characterization may include calculating a width of spatial correlation coefficient and/or a spatial correlation coefficient slope of the potential MTR and comparing the width of spatial correlation coefficient to a threshold width of spatial correlation coefficient and/or comparing the spatial correla-
(Continued)

tion coefficient slope to a threshold spatial correlation coefficient slope for the potential MTR to be characterized as an actual MTR or a defect (crack).

6 Claims, 14 Drawing Sheets

Related U.S. Application Data

(60) Provisional application No. 62/897,887, filed on Sep. 9, 2019.

(51) Int. Cl.
*G01N 29/07* (2006.01)
*G01N 29/50* (2006.01)

(52) U.S. Cl.
CPC ......... *G01N 29/4427* (2013.01); *G01N 29/50* (2013.01); *G01N 2291/0234* (2013.01); *G01N 2291/0289* (2013.01)

(56) References Cited

U.S. PATENT DOCUMENTS

| | | | |
|---|---|---|---|
| 5,635,644 | A | 6/1997 | Ishikawa |
| 6,387,197 | B1 | 5/2002 | Bewlay et al. |
| 6,494,098 | B1 | 12/2002 | Leybovich |
| 2010/0008462 | A1 | 1/2010 | Killian |
| 2010/0121584 | A1 | 5/2010 | Moreau |
| 2012/0132005 | A1 | 5/2012 | Turner |
| 2013/0208951 | A1 | 8/2013 | Salem et al. |
| 2013/0253858 | A1* | 9/2013 | Glavicic ............ G01N 9/002 702/56 |
| 2013/0308419 | A1* | 11/2013 | Singh ............... G01N 29/262 367/7 |
| 2014/0074410 | A1 | 3/2014 | Glavicic |
| 2014/0123761 | A1 | 5/2014 | Turner |
| 2016/0060729 | A1 | 3/2016 | Ito |
| 2019/0086343 | A1 | 3/2019 | Cernatescu et al. |

OTHER PUBLICATIONS

Tewari et al., "Quantitative characterization of spatial clustering in three-dimensional microstructures using two-point correlation functions" Acta Materialia 52 (2004) 307-319 (Year: 2004).*

European Patent Office, European Search Report dated Jul. 9, 2021 in Application No. 21162164.4.

Lobkis O I et al., "Ultrasonic backscattering in polycrystals with elongated single phase and duplex microstructures", ULTRASONICS, vol. 52, No. 6, Dec. 31, 2012 (Dec. 31, 2012), pp. 694-705, XP028923585, ISSN: 0041-624X, DOI: 10.1016/J.ULTRAS.2011.12.002.

Blackshire James L. et al., "Coherent ultrasonic backscatter within a textured titanium alloy", AIP Conference Proceedings, Jan. 1, 2019 (Jan. 1, 2019), pp. 020021-1-020021-7, XP055805471, New York, US ISSN: 0094-243X, DOI: 10.1063/1.5099725.

Humbert M et al., "Analysis of backscattered ultrasound amplitude of Ti-5.8AI-4Sn-3.5Zr-0.7Nb-0.5Mo-0.3Si samples in terms of their microstructures and local textures", Acta Materialia, , Elsevier, Oxford, GB, vol. 57, No. 3, Feb. 1, 2009 (Feb. 1, 2009), pp. 708-714, XP025860271, ISSN: 1359-6454, DOI: 10.1016/J.ACTAMAT.2008.10.012.

Bhattacharjee A et al, "Correlating Ultrasonic Attenuation and Microtexture in a Near-Alpha Titanium Alloy" Metallurgical and Materials, Transactions A, Springer-Verlag, New York, vol. 42, No. 8, Feb. 12, 2011 (Feb. 12, 2011), pp. 2358-2372, XP035069768, ISSN: 1543-1940, DOI: 10.1007/S11661-011-0619-X.

Pilchak, et al., "A Quantitative Assessment of Microtexture in Titanium Alloys using Destructive and Nondestructive Methods", Microsc. Microanal. 20 (Suppl 3), 2014 (Year: 2014), doi: 10.1017/S1431927614008976, pp. 1448-1449.

Livings et al., "Detection of Microtexture Regions in Titanium Turbine Engine Disks using Process Compensated Resonance Testing: A Modeling Study", AIP Conference Proceedings 2102, 020022 (2019), 45th Annual Review of Progress in Quantitative Nondestructive Evaluation, vol. 38 AIP Conf. Proc. 2102 (Year: 2019), https://doi. org/10.1063/1.5099726, pp. 020022-020022-10.

Yang et al., "Ultrasonic Propagation and Scattering in Duplex Microstructures with Application to Titanium Alloys", J Nondestruct Eval (2012) 31: pp. 270-283, May 17, 2012, Springer Science Business Media, LLC, DOI 10.1007/sl0921-012-0141-0.

Akanda, et al., "Ultrasonic Shear Wave Technique for Sensitive Detection and Sizing of Small Closed Cracks", USME International Journal, Series A., vol. 45, No. 2, 2002 (Year:2002), pp. 252-261.

Cepel, et al., "Spatial Correlation Coefficient Images for Ultrasonic Detection", IEEE Transactions on Ultrasonics, Ferroelectronics, and Frequency Control, vol. 54, No. 9, Sep. 2007 (Year: 2007), pp. 1841-1850.

USPTO; Restriction/Election Requirement dated Mar. 18, 2022 in U.S. Appl. No. 16/818,946.

USPTO; Pre-Interview First Office Action dated Jun. 7, 2022 in U.S. Appl. No. 16/818,946.

USPTO; Notice of Allowance dated Jul. 26, 2022 in U.S. Appl. No. 16/818,946.

* cited by examiner

FIG. 2A   Fig. 2B

MICROTEXTURE REGION CHARACTERIZATION SYSTEMS AND METHODS

CROSS-REFERENCE TO RELATED APPLICATIONS

This application is a divisional of, and claims priority to, and the benefit of U.S. Non-Provisional application Ser. No. 16/818,946, entitled "MICROTEXTURE REGION CHARACTERIZATION SYSTEMS AND METHODS", which is a non-provisional of, and claims priority to, and the benefit of U.S. Provisional Application No. 62/897,887, entitled "TEXTURE CHARACTERIZATION," filed on Sep. 9, 2019, both of which are hereby incorporated by reference in their entirety.

FIELD

The present disclosure relates to the methods and systems for characterizing microtexture regions (MTRs) of polycrystalline metallic components.

BACKGROUND

MTRs exist in titanium alloys, nickel alloys, or the like. A MTR may contain hexagonal a-phase crystallites aligned, mostly, in the same or close crystallographic orientations in a region far greater than a typical a grain size. The presence of MTRs may reduce service life of various components. For example, the existence of MTR was linked to dwell fatigue susceptibility, which may cause early failure in titanium-based jet engine components. Typical methods for MTR characterization are destructive to the component. Commonly used ultrasonic nondestructive inspections are primarily dedicated to detection of internal cracks. In such an inspection, amplitude of backscattered ultrasonic signals from an over-sized MTR may exceed the rejection threshold set for cracks and potentially cause false rejection of the component.

SUMMARY

A method is disclosed herein. The method may comprise: scanning a plurality of actual microtexture regions (MTRs) of a component with an ultrasonic transducer; selecting a reference point of each actual MTR in the plurality of actual MTRs; compiling a spatial correlation coefficient data for each actual MTR in the plurality of actual MTRs relative to the reference point of each actual MTR; calculating at least one of a threshold width of spatial correlation coefficient and a threshold spatial correlation coefficient slope for characterizing a future potential MTR as being a future actual MTR or a future crack or defect; and calculating at least one of a second threshold width of spatial correlation coefficient and an elongation direction for characterizing the future actual MTR as being a future rejectable MTR or a future acceptable MTR.

In various embodiments, compiling spatial correlation coefficient data is compiled in the elongation direction of each actual MTR, with a maximum cross-section area, in the plurality of actual MTRs. The scanning may be performed in a tank filled with a fluid, and wherein the component is disposed in the tank. The spatial correlation coefficient data may be calculated based on a spatial correlation coefficient equation. The at least one of the threshold width of spatial correlation coefficient and the threshold spatial correlation coefficient slope may be determined based on a normal distribution of the plurality of actual MTRs. The reference point may be based on a maximum amplitude of a transducer for each actual MTR. The method may further comprise calculating the threshold width of spatial correlation coefficient and the threshold spatial correlation coefficient slope.

A method is disclosed herein. The method may comprise: scanning a component with an ultrasonic transducer with a shear wave beam at a depth of a potential microtexture region (MTR), the potential MTR including an area of interest; rotating the component about an axis, the axis extending through the area of interest; scanning the component at a plurality of angles between 0 and 360 degrees in a plane defined by the axis; determining an elongation direction of the potential MTR; analyzing a spatial correlation coefficient profile along the elongation direction of the potential MTR relative to the area of interest; characterizing the potential MTR as an actual MTR or a defect; characterizing the actual MTR as a rejectable MTR or an acceptable MTR when the potential MTR is characterized as the actual MTR.

In various embodiments, analyzing the spatial correlation coefficient profile may further comprises comparing a width of spatial correlation coefficient of the area of interest with a threshold width of spatial correlation coefficient for the potential MTR to be characterized as the actual MTR, wherein the threshold width of spatial correlation coefficient may be tied with a maximum amplitude of ultrasonic backscattered signals acquired from the area of interest. The potential MTR may be characterized as the actual MTR when the width of spatial correlation coefficient is greater than the threshold width of spatial correlation coefficient. The potential MTR may be characterized as the defect when the width of spatial correlation coefficient is less than the threshold width of spatial correlation coefficient. Analyzing the spatial correlation coefficient profile may further comprise comparing a spatial correlation coefficient slope from the area of interest with a threshold spatial correlation coefficient slope for the potential MTR to be characterized as the actual MTR, wherein the threshold spatial correlation coefficient slope may be tied with a maximum amplitude of ultrasonic backscattered signals acquired from the area of interest. The potential MTR may be characterized as the actual MTR when the spatial correlation coefficient slope is less than the threshold spatial correlation coefficient slope, and the potential MTR is characterized as the defect when the spatial correlation coefficient slope is greater than the threshold spatial correlation coefficient slope. Analyzing an actual MTR may further comprise comparing a width of spatial correlation coefficient of the area of interest with a second threshold width of spatial correlation coefficient for the actual MTR to be characterized as the acceptable MTR when the elongation direction is deemed a high risk direction, wherein the actual MTR is characterized as the acceptable MTR when the width of spatial correlation coefficient is less than the second threshold width of spatial correlation coefficient, and wherein the actual MTR is characterized as the rejectable MTR when the width of spatial correlation coefficient is greater than the second threshold width of spatial correlation coefficient.

A method is disclosed herein. The method may comprise: scanning a batch of components with an ultrasonic transducer; determining a portion of the batch of components including a potential microtexture regions (MTRs) based on a microtexture level indicator, the potential MTR including an area of interest; analyzing a spatial correlation coefficient profile of the potential MTR along an elongation direction relative to the area of interest; and characterizing the potential MTR of each component in the portion of the batch of components as an actual MTR or a defect.

In various embodiments, the method may further comprise scrapping the component when the potential MTR is characterized as the defect or a rejectable MTR. The potential MTRs may be based on calculating the microtexture level indicator or possessing at least one rejectable or marginally rejectable indication resulted from an ultrasonic crack inspection. A potential MTR may be a high amplitude spot in an area with MTR content as identified by a microtexture level indicator, a rejectable indication, or a marginally rejectable indication as defined by comparing a maximum amplitude at the potential MTR to an established threshold amplitude in an ultrasonic crack inspection, and the microtexture level indicator may comprise at least one of an average peak factor, a standard deviation of peak amplitudes, and a baseband bandwidth. Analyzing the spatial correlation coefficient profile may further comprise comparing a width of spatial correlation coefficient of the area of interest with a threshold width of spatial correlation coefficient for the potential MTR to be characterized as the actual MTR. Analyzing the spatial correlation coefficient profile may further comprises comparing a spatial correlation coefficient slope from the area of interest to an adjacent position with a threshold spatial correlation coefficient slope for the potential MTR to be characterized as the actual MTR, and analyzing the spatial correlation coefficient may further comprises comparing a width of spatial correlation coefficient of the potential MTR with a second threshold width of spatial correlation coefficient for the actual MTR to be characterized as the acceptable MTR.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

FIG. 2A illustrates a C-scan of a baseline sample, in accordance with various embodiments;

FIG. 2B illustrates a C-scan of a low noise sample, in accordance with various embodiments;

DETAILED DESCRIPTION

Figure 1:
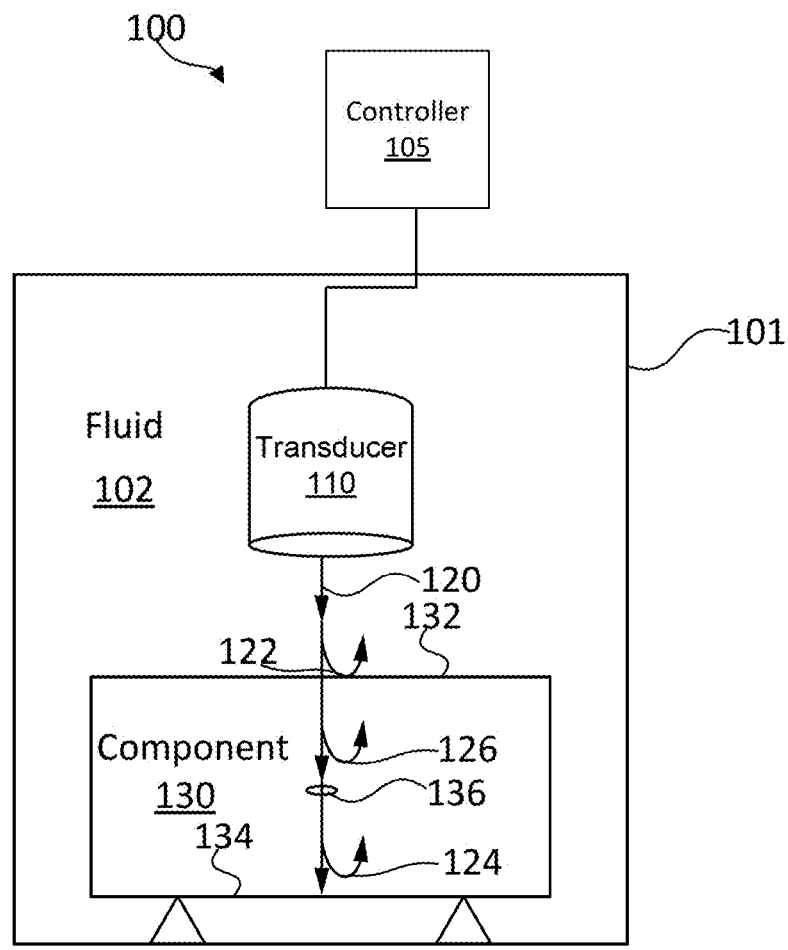
FIG. 1 illustrates a system of MTR characterization, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with gas turbine engines. However, various aspects of the disclosed embodiments may be adapted for optimized performance in a variety of engines or other applications. As such, numerous applications of the present disclosure may be realized.

In various embodiments, statistical parameters extracted from backscattered ultrasonic signals over an area of interest may be analyzed to distinguish different levels of MTR contents. In various embodiments, a second ultrasonic characterization scheme is based on spatial correlation analysis of a single potential MTR as disclosed herein. The spatial correlation analysis may be used as a follow-up to a common ultrasonic crack detection process to distinguish over-sized MTRs from cracks and thus reduce the chance of false rejection. In various embodiments, the spatial correlation analysis may be used to investigate the nature of any individual potential MTR of interest. For example, it could follow the zone-screening process and target any high amplitude ('hot') spots of interest within a specific zone. A decision on whether the potential MTR is a true MTR could be made.

Ultrasonic waves propagating in polycrystalline metals create backscattered noise due to variations of physical properties in microstructures. Microstructure is a fine structure of material. The strength of backscattered noise is related to wavelength, beam properties, and microstructure properties, etc. In case of titanium forgings, typical grain sizes may be around 10 microns, while MTR sizes could be in order of a few hundreds to a few thousands microns. For an ultrasonic transducer with a center frequency of 15 MHz, its wavelength is about 400 μm in a longitudinal mode and is about 200 μm in a transverse wave mode, respectively. As these wavelengths are far greater than the grain sizes but in comparable with MTR sizes, it is expected that MTRs are far more significant contributors to backscattered noise than typical grains under this working frequency. The selection of ultrasonic working frequency is dependent on MTR sizes of interest, geometry, material properties, and so on. The strength of backscattered noise is also significantly influenced by the angle between the orientation of a microstructural feature and the propagating direction of ultrasonic waves. For instance, an ellipsoidal reflector generates least amount of backscattered noise when its elongation direction is parallel with the wave propagation direction. In contrast, a same sized ellipsoidal reflector could generate far greater amount of backscattered noise when its elongation direction is normal to the wave propagation direction, in which the maximum cross-section face is normal to the wave propagation direction. Consequently, it is ideal to choose the incidence angle of ultrasonic waves to be normal to the grain flow line direction as well as the maximum cross-section face of the region of interests. The normal direction of the grain flow line direction (i.e. the elongation direction) is coincidence with the normal direction of the maximum cross-section face when the reflector is axisymmetric with respect to the elongation direction. The amplitude of ultrasonic backscattered signals is also related to the degree of acoustic impedance mismatch between the reflector and its surrounding materials. In case of a crack, high acoustic impedance mismatch exist between air and the base metal. In case of a MTR, relative low acoustic impedance mismatch between oriented crystallites within the MTR and more randomly oriented crystallites nearby. As a result, amplitude of reflection ultrasonic backscattered signals from a MTR could be weaker and/or lack of a clear boundary in comparison to those of a crack of similar size, orientation, etc. For a component of complex geometry, it is often wise to segment the region of interests based on its primary grain flow line orientation and select the corresponding incident angles and gating parameters for each individual region. Generally, efforts shall be made to control relevant factors in the inspection process to increase comparability among regions of interests. It is expected that sensitivity of MTR evaluation increases when more relevant factors are controlled. For example, more sensitive comparisons may be achieved among areas with same or close geometric features, same flow line orientations and inspected with same ultrasonic beam properties.

In a typical amplitude C-scan image, a peak amplitude is recorded at each scanning position, whereas the peak amplitude corresponding to the maximum (peak) value of backscattered noise within a pre-defined (time) gate recorded at the associated scanning position. As a whole, a C-scan image is a two-dimensional matrix of peak amplitudes of backscattered noises. Consequently, a number of statistical indicators can be derived from a C-scan image, either treated as a one-dimensional sequence, or a two-dimensional matrix. Some statistical estimators may be derived from the corresponding spatial frequency spectrum, which is a two-dimensional Fourier transform of the original image.

Referring now to FIG. 1, in accordance with various embodiments, a system 100 of MTR characterization of a component 130 is illustrated, in accordance with various embodiments. The system comprises a tank 101, a component 130, a transducer 110, and a controller 105. The component 130 may comprise a metal, metal alloy, or any other suitable material. The component 130 may be a stainless steel alloy, a nickel alloy, a titanium alloy, an aluminum alloy, or the like. In various embodiments, the tank 101 may be filled with a fluid 102, such as water or the like. The component 130 is disposed in the tank 101. The component 130 may be disposed on supports disposed between the component 130 and a surface of the tank 101. The transducer 110 may be a standard single-element immersion ultrasonic transducer or a phased array transducer containing a number of elements. The transducer 110 may also be disposed in the tank 101 and electrically coupled to the controller 105.

The system 100 includes the controller 105 in electronic communication with the transducer 110. In various embodiments, controller 105 may contain a pulser/receiver, which can drive the transducer 110 to transmit and receive ultrasonic pulses. In various embodiments, controller 105 may also contain a high-speed analog-to-digital converter, which can convert received analog ultrasonic signals into digital signals for recording and processing. In various embodiments, controller 105 may contain a motion control module, which can position the transducer 110 at a desired scanning position and perform automated inspection of a component 130 following a pre-defined scanning surface. In various embodiments, controller 105 may contain a software tool to perform various signal/image acquisition, filtering, display and storage functionalities. In various embodiments, controller 105 may contain a software interface, which enables user adjustment of inspection parameters of all relevant subsystems mentioned previously. In various embodiments, controller 105 may contain a PC to host all software tools as well as hardware components. In various embodiments, controller 105 may be configured as a central network element or hub to access various systems and components of system 100. Controller 105 may comprise a network, computer-based system, and/or software components configured to provide an access point to various systems and components of system 100.

In various embodiments, controller 105 may comprise a processor. In various embodiments, controller 105 may be implemented in a single processor. In various embodiments, controller 105 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 105 may comprise a processor configured to implement various logical operations in response to execution of instructions, for example, instructions stored on a non-transitory, tangible, computer-readable medium configured to communicate with controller 105.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 105 may be in electronic communication with the transducer 110. The transducer 110 may comprise an ultrasonic single-element transducer, a phased array transducer or the like. For example, the transducer 110 may be configured to convert a broad band excitation signal into an ultrasonic wave. The transducer 110 may be configured to produce an ultrasonic wave 120 into within the tank 101 filled with the fluid 102 and receive a return signal of the ultrasonic wave 120. The ultrasonic wave 120 may propagate within the component 130. For example, under a longitudinal wave mode, a first return signal 122 may be produced on a front surface 132 of the component 130. Similarly, a second return signal 124 may be produced on a back surface 134 of the component 130. If there is a defect 136 in the component, a third return signal 126 may be produced from the defect 136 of the component 130.

In various embodiments, the controller 105 may be programmed to control the position and excitation parameters of transducer 110. Although shown as controlling the transducer, in various embodiments, a controller 105 may be coupled to a robot/servomotor that is coupled to the component 130 and programmed to control the position of the component 130 while the transducer 110 remains stationary. In various embodiments, the transducer 110 may be moved automatically during operation.

In various embodiments, the transducer 110 is configured to receive ultrasonic backscattered noise associated with the microstructure variations within the component 130. "Backscattered noise," as disclosed herein, contains ultrasonic waves 120 reflected by microstructures in component 130 and received by the transducer 110. The controller 105 may record the backscattered noise collected at each X-Y coordinates on a scanning surface of a sample of the component 130. For example, with brief reference to FIGS. 2A and 2B, a C-Scan of a baseline sample (FIG. 2A) and a low noise sample (FIG. 2B) of a component 130 is illustrated. The baseline sample and the low noise sample are same component fabricated with different heat treatment processes, respectively. Consequently, the low noise sample has lower MTR content as compared to that of the baseline sample. A "C-Scan," as referred to herein, is data collected from an ultrasonic inspection that is plotted on a top view of the component surface under test. A C-scan image allows pseudo color to represent the peak amplitudes within a time or depth gate as a function of transducer position. The two-dimensional images can be generated on flat, or curved, parts by tracking data to an X-Y position on a scanning surface. In various embodiments, the peak amplitude of the baseline sample (FIG. 2A) and the low noise sample (FIG. 2B) are recorded. As shown, the backscattered noise of the low noise sample (FIG. 2B) has a relatively tight amplitude distribution over the sample (i.e., the amplitude of backscattered noise has a smaller standard deviation), in comparison with backscattered noise of the baseline sample (FIG. 2A). This backscattered noise may be quantified and used to characterize a MTR content of a component 130.

From the data collected in the C-Scan, a plot of peak amplitudes for a given sample, or a selected zone within the sample, in descending order from largest to smallest may be established. The peak amplitudes may correspond to backscattered noise from MTRs within the sample, as well as other microstructural features. A peak factor may be defined by the following equation:

$$\frac{\text{Peak}}{\text{Factor}} = \frac{\text{Peak Amplitude} - \text{Mean Amplitude}}{\text{Mean Amplitude}}$$

Figure 2C:
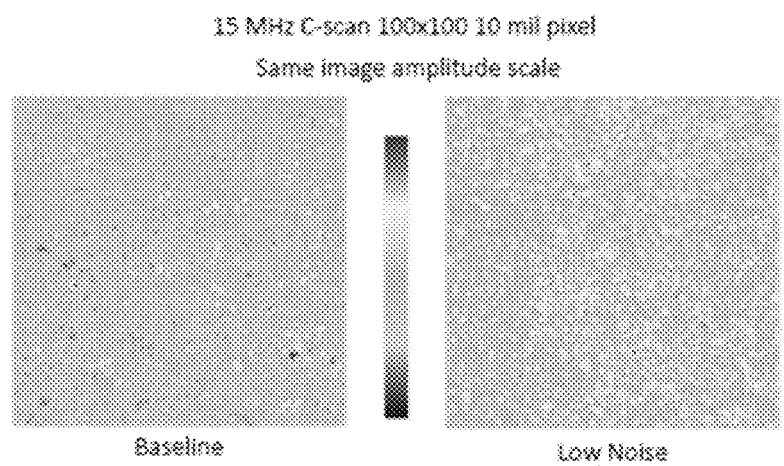
FIG. 2C illustrates a peak factor plot comparing the baseline sample from FIG. 2A to the low noise sample of FIG. 2B.
Figure 2C:
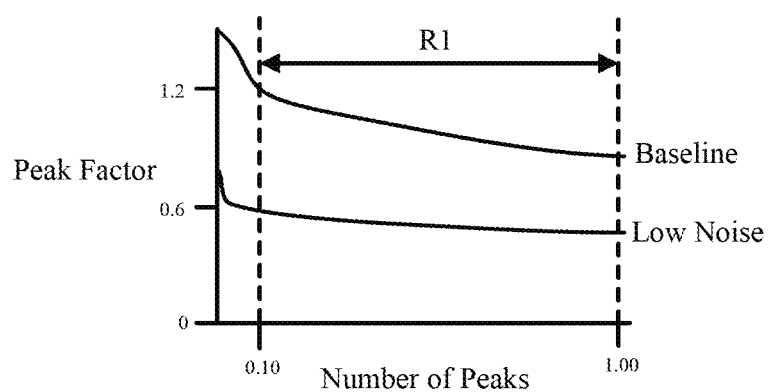

A mean of the peak factors may be calculated over a pre-determined sample size. For example, a sample size may be 5-100 peak factors, 10-1,000 peak factors, or the like. Alternatively, a mean of the peak factors may be calculated over a qualified pool of samples. For example, all peak amplitudes greater than the sum of the mean peak amplitude and two times of the standard deviation may be selected. The first 5-10 peak factors may be removed from the sample as potential outliers. Any number of outliers may be removed from the sample and be within the scope of this disclosure. The peak factor for a sample/region may be plotted vs. the sample index. For example, each amplitude in the sample/region may correspond to a respective peak factor. In various embodiments, in plotting the peak factor as a function of the sample index, two samples/regions may be compared to characterize MTR content. A lower peak factor may correspond to lower microtexture levels and/or greater service life of the sample and/or component, in combination with knowledge of other critical factors related to service life. For example, referring now to FIG. 2C, the peak factor vs. the number of peaks is plotted for the baseline sample (FIG. 2A), and the low noise sample (FIG. 2B), respectively. The peak factor of each peak is calculated of range R1, which is normalized. For example, when the range is from the $10^{th}$ largest peak to the $100^{th}$ largest peak, the number of peaks is plotted from 0.10 to 1.00. From the plot shown in FIG. 2C, an average peak factor can be calculated over the range R1. The average peak factor can be utilized to characterize each sample (i.e., baseline sample (FIG. 2A) and low noise sample (FIG. 2B). As shown, the peak factor, and average peak factor, of the low noise sample (FIG. 2A) is lower over the entire range R1 compared to the baseline sample (FIG. 2A). As such, the low noise sample may be characterized as having lower microtexture levels and/or greater service life than the baseline sample (FIG. 2A). In various embodiments, the peak factor may be utilized as an indicator of a microtexture level of a given area of interest, a given sample, component, or the like.

Figure 3A:
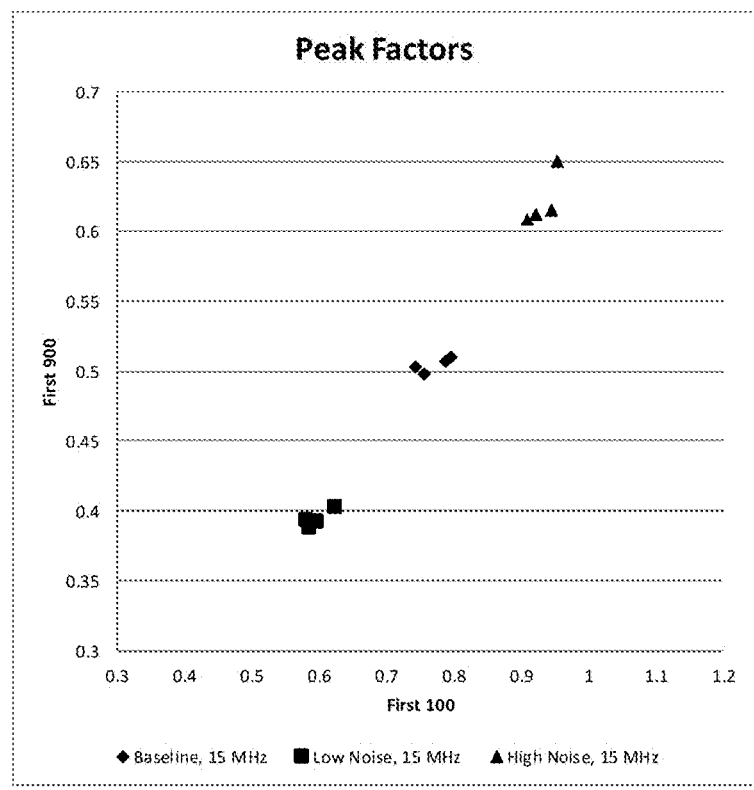
FIG. 3A illustrates an averaged peak factor comparison of various samples, in accordance with various embodiments.

In various embodiments, an indicator of a microtexture level may comprise an average peak factor comparison, a standard deviation of peak amplitudes comparison, and/or a baseband bandwidth comparison. For example, peak factors may be plotted as an average peak factor over a first range (e.g., peaks 10-1,000) vs. average peak factor over a second range (e.g., peaks 10-100) (i.e., FIG. 3A). In this regard, a microtexture level of samples may be compared. For example, with reference to FIG. 3A, peak factors of the baseline sample from FIG. 2A, the low noise sample from 2B, and a high noise sample are plotted over a first range (10-1,000) vs. a second range (10-100). The plot may provide visual indications of which samples (i.e., baseline, low noise, or high noise) have lower or higher microtexture levels. In various embodiments, the plot may provide visual indications of which region (i.e., a first region of the baseline compared to a second region of the baseline) has lower or higher microtexture levels. The microtexture levels may be utilized to determine which regions of a component may experience greater service life, which heat treatments provides greater service life for a given component, which components in a batch of components provide greater service life, and/or which components in a batch of components should be scrapped.

Figure 3B:
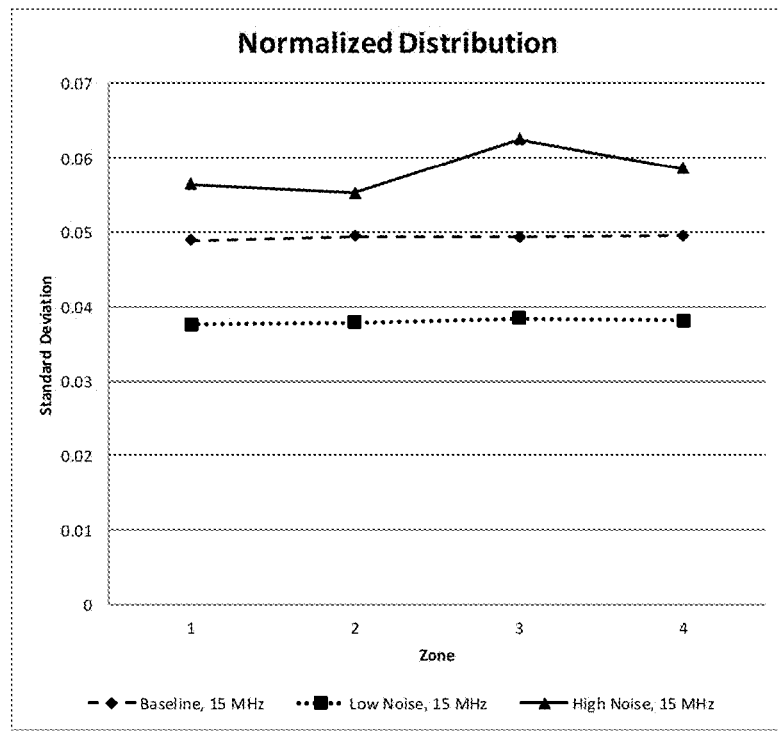
FIG. 3B illustrates a standard deviation comparison of various samples, in accordance with various embodiments.

In various embodiments, an indicator of a microtexture level may comprise a standard deviation of peak amplitudes comparison. Despite efforts made to achieve similar amplitude range in each testing zone, some variations in amplitudes exist due to variations in incident wave strength, geometry, material properties and beam properties. Thus, peak amplitudes acquired from different samples/zones may be scaled to have same mean amplitude first to enable direct comparison with each other. The standard deviation of scaled peak amplitudes may be plotted as a standard deviation of a region (i.e., zone) vs. the region (i.e., zone) of the sample (i.e., FIG. 3B). In this regard, a microtexture level of samples may be compared. For example, with reference to FIG. 3B, standard deviations of the baseline sample from FIG. 2A, the low noise sample from 2B, and a high noise sample are plotted over various zones, or regions, of a sample. The plot may provide visual indications of which samples (i.e., baseline, low noise, or high noise) have lower (e.g., low noise) or higher (e.g., high noise) microtexture levels. In various embodiments, the plot may provide visual indications of which region (i.e., a first region of the baseline compared to a second region of the baseline) has lower or higher microtexture levels. The microtexture levels may be utilized to determine which regions of a component may experience greater service life, which heat treatments provides greater service life for a given component, which components in a batch of components provide greater service life, and/or which components in a batch of components should be scrapped.

Figure 3C:
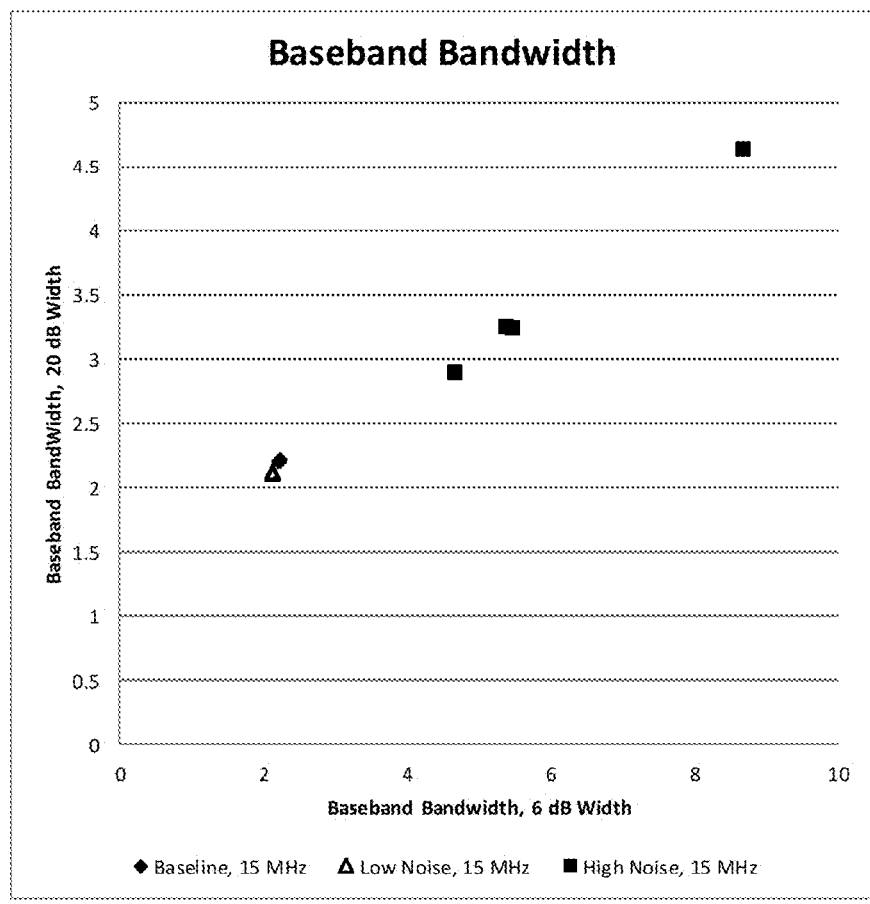
FIG. 3C illustrates a baseband bandwidth comparison of various samples, in accordance with various embodiments.

In various embodiments, an indicator of a microtexture level may comprise a baseband bandwidth comparison. A C-scan amplitude image may be transformed to frequency domain utilizing a two-dimensional Fourier transform. Generally, most power in the frequency domain locates within the baseband, which is the band close to the zero frequency. The bandwidth of the baseband contains useful information of how backscattered noises are distributed spatially. Herein, a bandwidth is not limited to the common definition of a 6 dB width, but may be a 10 dB width, a 20 dB width, or like. Moreover, a bandwidth is defined as the longest width of the baseband, as a two-dimensional baseband may not be axis-symmetric, or its elongation direction may not aligned with either axis of the domain. Consequently, a baseband bandwidth defined with a first width (e.g., 20 dB width) of the sample may be plotted vs. a baseband bandwidth defined with a second width (e.g., 6 dB width) of the sample (i.e., FIG. 3C). In this regard, a microtexture level of samples may be compared. For example, with reference to FIG. 3C, baseband bandwidth in a 6 dB sense of the baseline sample from FIG. 2A, the low noise sample from 2B, and a high noise sample are plotted against baseband bandwidth in a 20 dB sense of the sample. The plot may provide visual indications of which samples (i.e., baseline, low noise, or high noise) have lower (e.g., low noise) or higher (e.g., high noise) microtexture levels. In various embodiments, the plot may provide visual indications of which region (i.e., a first region of the baseline compared to a second region of the baseline) has lower or higher microtexture levels. The microtexture levels may be utilized to determine which regions of a component may experience greater service life, which heat treatments provides greater service life for a given component, which components in a batch of components provide greater service life, and/or which components in a batch of components should be scrapped.

Figure 4:
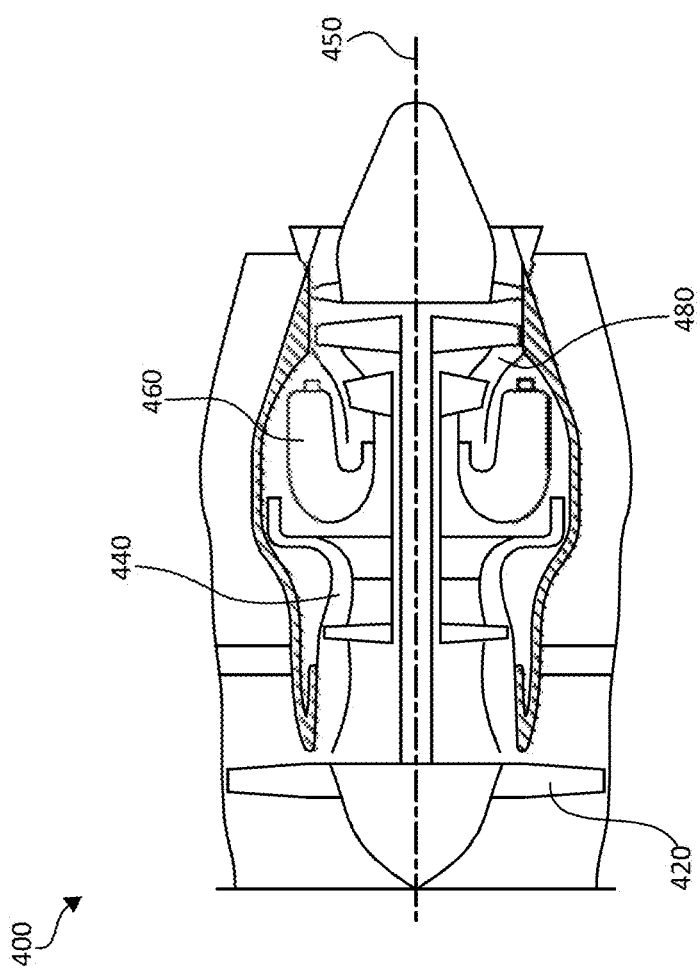
FIG. 4 illustrates a schematic view of a gas turbine engine, in accordance with various embodiments.

In various embodiments, this disclosure may be applied to a gas turbine engine in an aircraft, and specifically, in a fan blade, or other rotor blade, of a gas turbine engine. Referring to FIG. 4, a gas turbine engine 400 is illustrated according to various embodiments. The gas turbine engine 400 may generally comprise, in serial flow communication, a fan 420 through which ambient air is propelled, a compressor section 440 for pressurizing the air, a combustor 460 in which the compressed air is mixed with fuel and ignited for generating an annular stream of hot combustion gases, and a turbine section 480 for extracting energy from the combustion gases. Axis of rotation 450 may define the forward-aft position of the gas turbine engine 400. For example, the fan 420 may be referred to as forward of the turbine section 480 and the turbine section 480 may be referred to as aft of the fan 420. As air flows from the fan 420 to the more aft components of the gas turbine engine 400, the axis of rotation 450 may also generally define the direction of the air stream flow.

Figure 5:
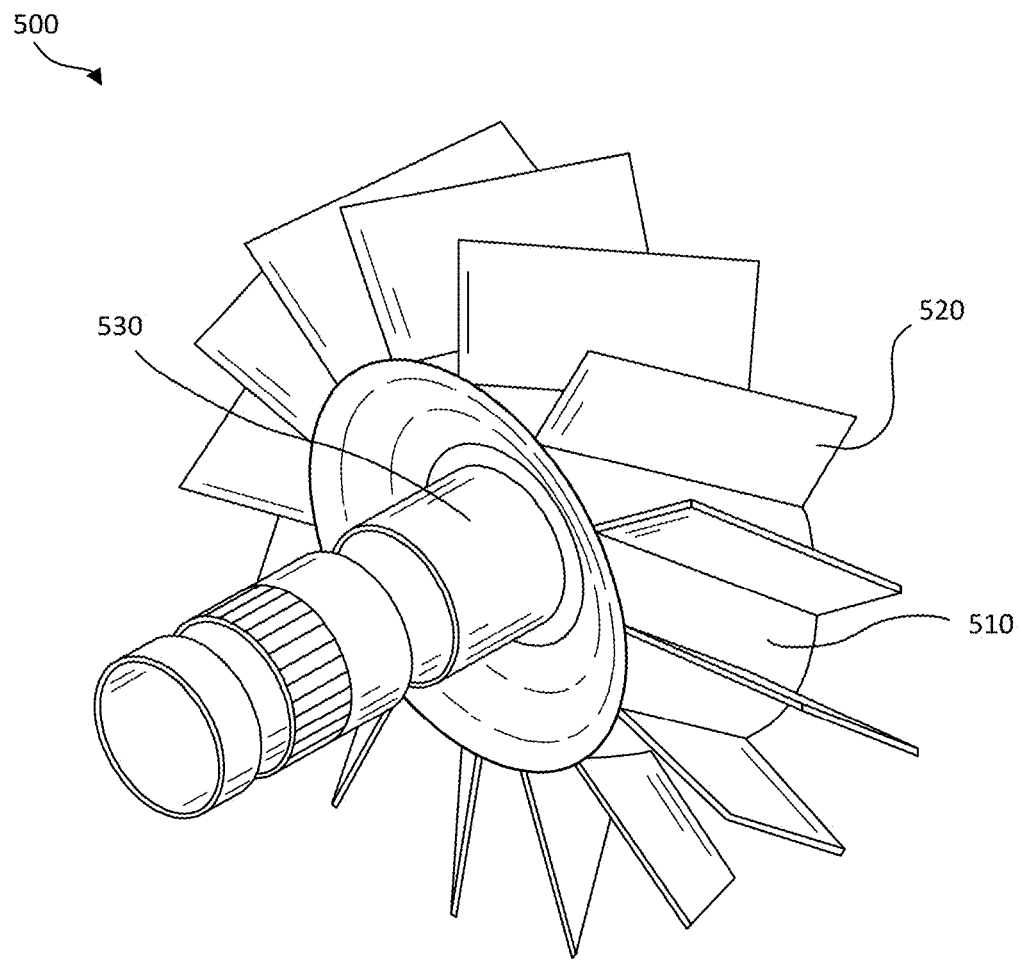
FIG. 5 illustrates perspective view of a rotor, in accordance with various embodiments.

Referring to FIGS. 4 and 5, in accordance with various embodiments, a rotor 500 which may be used in the gas turbine engine 400 of FIG. 4, or in any other adequate type of gas turbine engine, is illustrated. In the illustrated embodiment, the rotor 500 is a first stage of a high pressure compressor of the compressor section 440. However, it is understood that the rotor can be any other rotor of the gas turbine engine 400, including a turbine rotor, a fan rotor, and so on. The rotor 500 may comprise a rotor disk 510 which supports a circumferential array of regularly spaced blades 520. The rotor disk 510 and the blades 520 may be, but are not necessarily, integrally molded (i.e., form a monolithic structure). The rotor disk 510 may include a hub 530 for engaging a central shaft. With combined reference to FIGS. 1 and 5, the system 100 may be utilized to determine which regions of a component (e.g., rotor 500) may experience greater service life, which heat treatments provides greater service life for a given component (e.g., rotor 500), which components in a batch of components (e.g., a batch of rotor 500) provide greater service life, and/or which components in a batch of components (e.g., a batch of rotor 500) should be scrapped. Although described with respect to rotor 500, a microtexture analysis of any component is within the scope of this disclosure.

Figure 6:
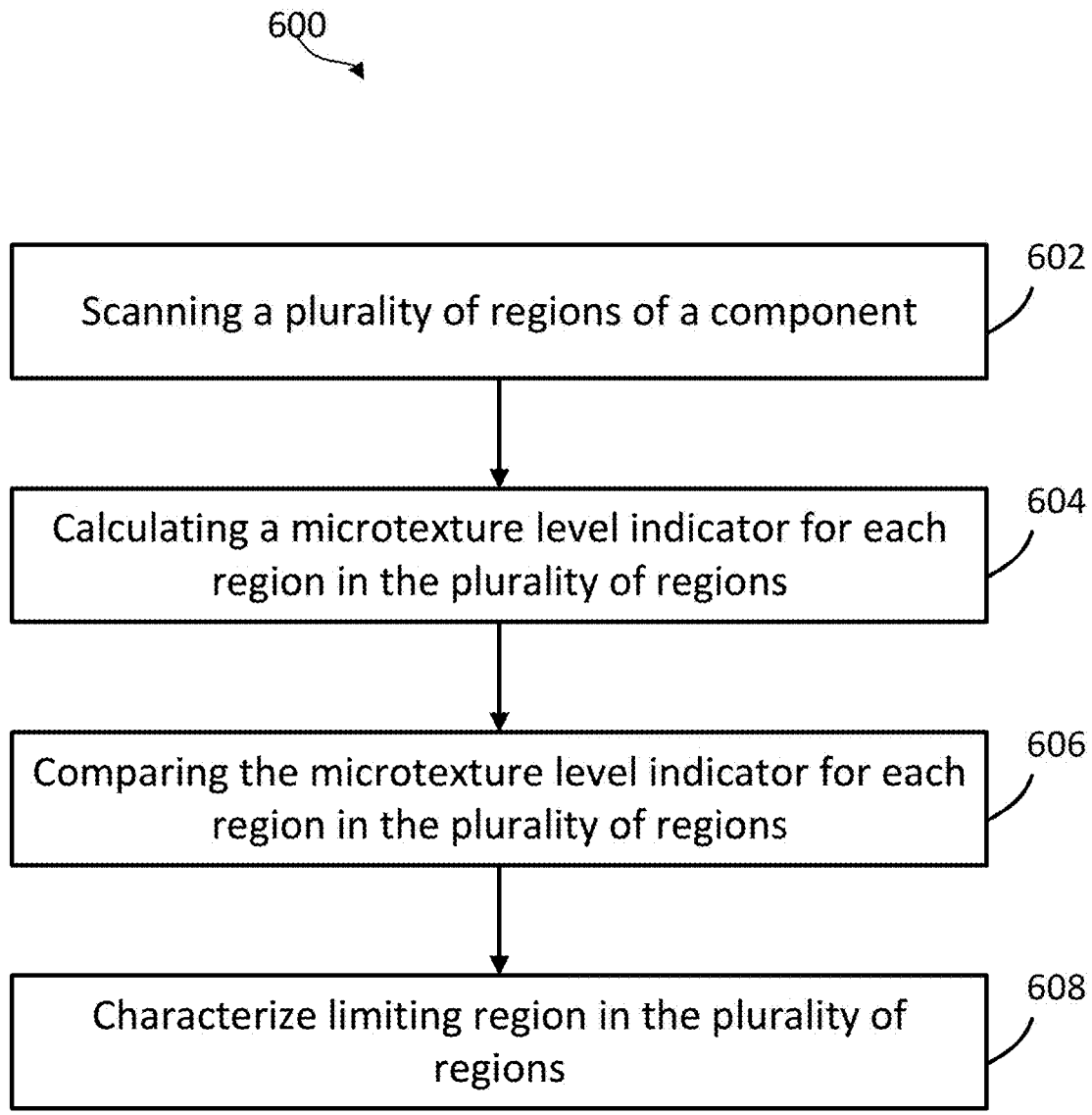
FIG. 6 illustrates a method of characterizing a limiting region of a component, in accordance with various embodiments.

Referring now to FIG. 6, a method 600 of determining a service life limiting region of a component is illustrated in accordance with various embodiments. The method comprises scanning a plurality of regions of a component (step 602). The scanning may be performed in accordance with the system 100 from FIG. 1. The component may comprise a rotor 500, or any other gas-turbine engine component. The scanning may be performed by an ultrasonic transducer, or the like. The method 600 may further comprise calculating a microtexture level indicator for each region in the plurality of regions (step 604). The microtexture level indicator may comprise at least one of an average peak factor, a standard deviation of peak amplitudes, and/or a baseband bandwidth.

The method 600 may further comprise comparing the microtexture level indicator for each region in the plurality of regions of the component (step 606). The plurality of regions involved are regions with same MTR requirement based on stress distribution, geometry, and so on. In this regard, the microtexture level indicator may be plotted providing a visual indication of the microtexture level indicator as a function of region. The method 600 may further comprise characterize limiting region in the plurality of regions of the component (step 608). In this regard, a region in the plurality of regions that includes the highest microtexture level indicator in the plurality of regions may be characterized as a limiting region of the component. The limiting region of the component may correspond to a service life limiting region of the component. A "service life limiting region" as disclosed herein may correspond to a region of a component that is likely to limit the service life of the component based on its microtexture level. By characterizing a component in this manner, a design of a component may be modified to increase a service life of the component. In various embodiments, characterizing refers to assigning a service life limit to the life limiting region of the component, or the like.

Figure 7:
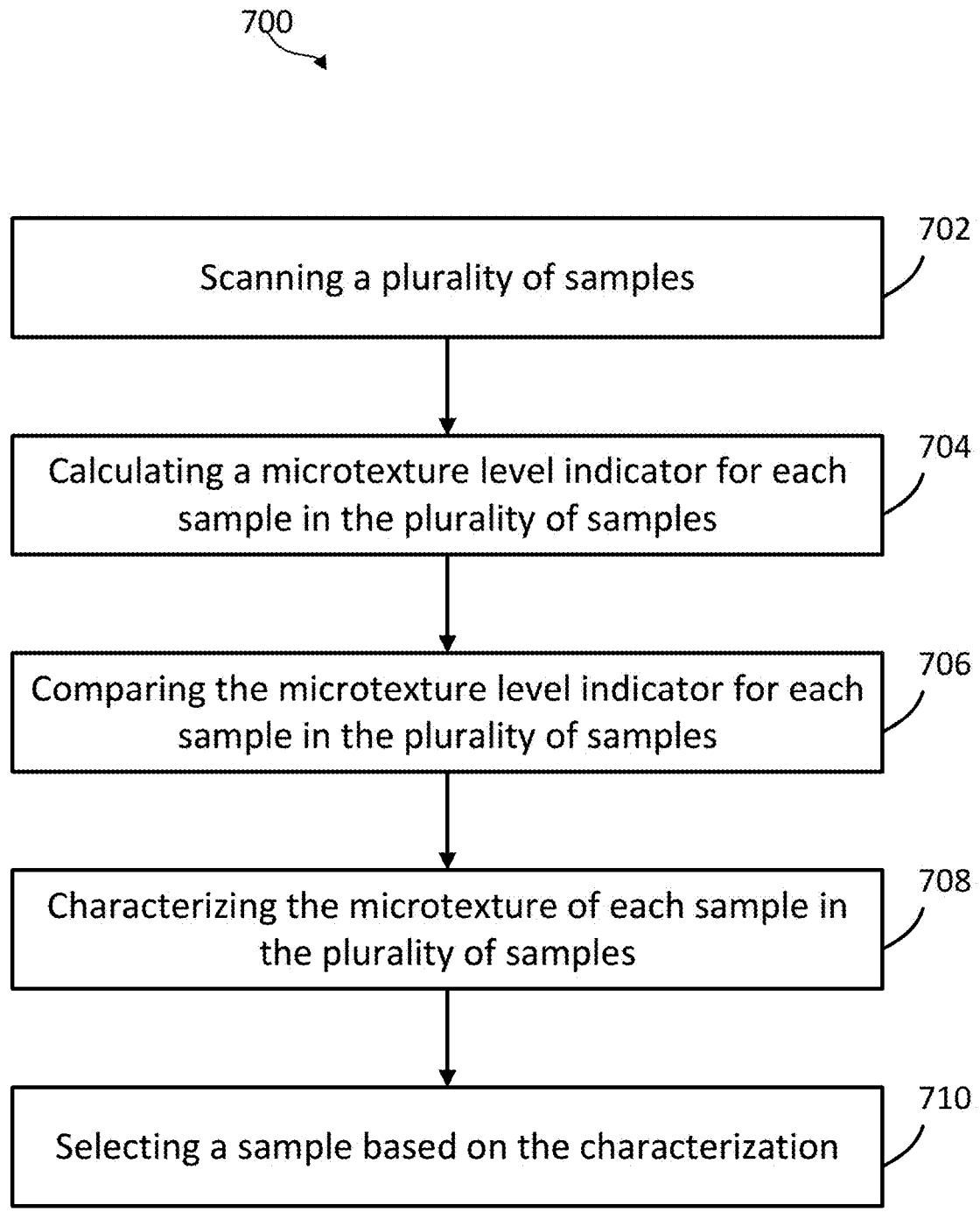
FIG. 7 illustrates a method of characterizing various treatments for a component.

Referring now to FIG. 7, a method 700 of determining a treatment method is illustrated in accordance with various embodiments. The method comprises scanning a plurality of samples (step 702). Each sample in the plurality of samples may comprise a different treatment method for a component, such as heat treatment, or the like. The scanning may be performed in accordance with the system 100 from FIG. 1. The scanning may be performed by an ultrasonic transducer, or the like. The method 700 may further comprise calculating a microtexture level indicator for each sample in the plurality of samples (step 704). The microtexture level indicator may comprise at least one of an average peak factor, a standard deviation of peak amplitudes, and/or a baseband bandwidth.

The method 700 may further comprise comparing the microtexture level indicator for each sample in the plurality of samples (step 706). In this regard, the method comprises scanning the same area of interest for each sample in a plurality of samples. The microtexture level indicator may be plotted providing a visual indication of the microtexture level indicator as a function of sample. The method 700 may further comprise characterizing the microtexture of each sample in the plurality of samples (step 708). In this regard, a sample in the plurality of samples that includes the lowest microtexture level indicator in the plurality of samples may be characterized as a treatment method resulting in the greatest potential service life of the sample. Each treatment method in the plurality of treatment methods may be ranked based on the characterization of the microtexture of each sample. By characterizing treatment methods of a component in this manner, a treatment method may be selected for a component in response to the characterization of the microtexture level of a respective sample (step 710).

Figure 8:
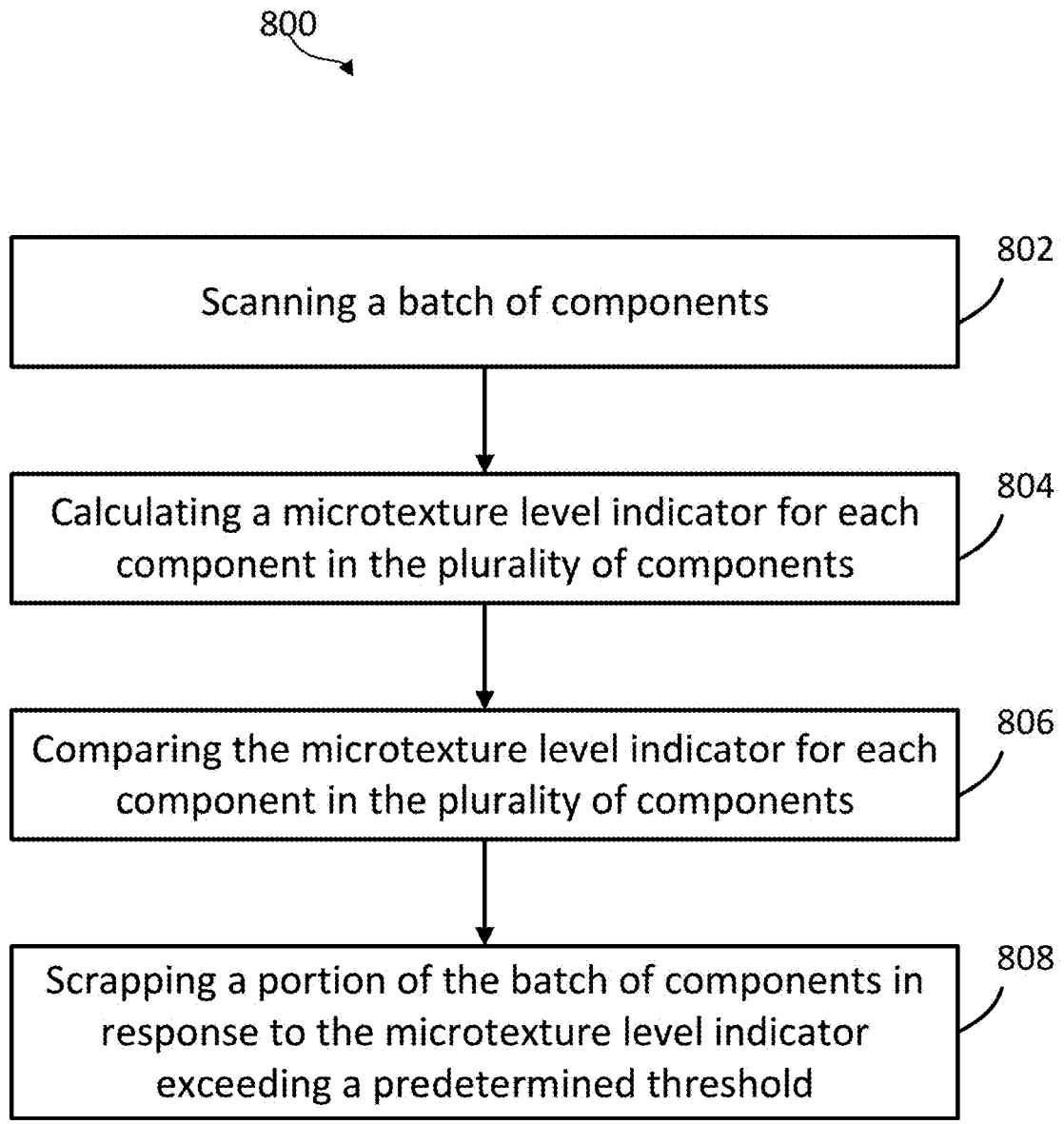
FIG. 8 illustrates a method of selecting components for use in production, in accordance with various embodiments.

Referring now to FIG. 8, a method 800 of determining selecting components for use in production is illustrated, in accordance with various embodiments. The method comprises scanning a batch of components (step 802). The scanning may be performed in accordance with the system 100 from FIG. 1. The component may comprise a rotor 500, or any other gas-turbine engine component. The scanning may be performed by an ultrasonic transducer, or the like. The method 800 may further comprise calculating a microtexture level indicator for each component in the batch of components (step 804). In various embodiments, a life limiting region from method 600 may be analyzed for each component in the batch of components. The microtexture level indicator may comprise at least one of an average peak factor, a standard deviation of peak amplitudes, and/or a baseband bandwidth.

The method 800 may further comprise comparing the microtexture level indicator for each component in the batch of components (step 806). In this regard, the microtexture level indicator may be plotted providing a visual indication of the microtexture level indicator as a function of the batch of components. The method 800 may further comprise scrapping a portion of the components in the batch of components in response to the microtexture level indicator of the portion of the components exceeding a predetermined threshold (step 808). In this regard, the components that are not scrapped may include a microtexture level indicator that is below the predetermined threshold. This may allow the selected components to provide enhanced service life compared to the scrapped components. By determining components for use in service in this manner, a service life of a fleet of components may be maximized.

In various embodiments, an area with potential MTRs may be identified from method 600, method 700, and method 800. It may be desirable to further target a spot with high amplitude within the area as a 'hot' spot, or a potential MTR. Alternatively, a potential MTR may be selected from a pool of rejectable or marginally rejectable indications from a standard ultrasonic crack detection process. It may be desirable to further define the potential MTR to determine whether the potential MTR is in fact an MTR, or whether the potential MTR is a defect, such as a crack, or the like.

Figure 9:
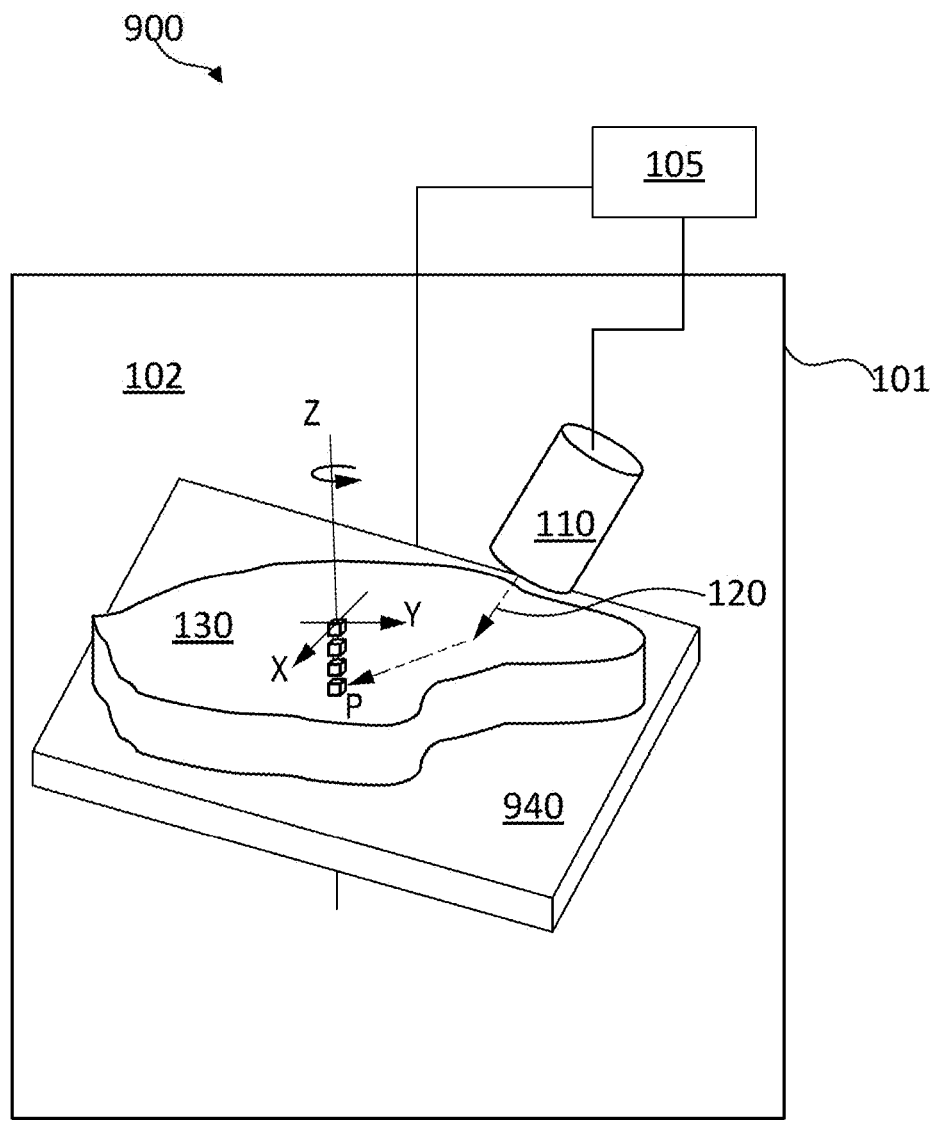
FIG. 9 illustrates a system of MTR characterization, in accordance with various embodiments.

Referring now to FIG. 9, in accordance with various embodiments, a system 900 of characterizing a potential MTR of a component 130 is illustrated, in accordance with various embodiments. The system comprises a tank 101, a component 130, a transducer 110, and a controller 105. In various embodiments, the tank 101 may be filled with a fluid 102, such as water or the like. The component 130 is disposed in the tank 101. The component 130 may be disposed on a turntable 940 configured to rotate about a centerline extending through the potential MTR identified from method 600, method 700, and/or method 800, or the potential MTR identified from a pool of rejectable or marginally rejectable indications resulted by a standard ultrasonic crack inspection. The transducer 110 may be a standard single-element immersion ultrasonic transducer or a phased array transducer containing a number of elements. The transducer 110 may also be disposed in the tank 101 and electrically coupled to the controller 105

The system 900 includes the controller 105 in electronic communication with the transducer 110 and/or turntable 940. In various embodiments, controller 105 may contain a pulser/receiver, which can drive the transducer 110 to transmit and receive ultrasonic pulses. In various embodiments, controller 105 may also contain a high-speed analog-to-digital converter, which can convert received analog ultrasonic signals into digital signals for recording and processing.

In various embodiments, controller 105 may contain a motion control module, which can position the turntable 940 and/or the transducer 110 at a desired scanning position and perform automated inspection of a component 130. For example, turntable 940 may be rotated about the Z-axis and/or transducer may be translated in the radial direction relative to the Z-axis. In this regard, the ultrasonic wave 120 may always intersect the axis of rotation (e.g., the Z-axis). In various embodiments, controller 105 may contain a software tool to perform various signal/image acquisition, filtering, display and storage functionalities. In various embodiments, controller 105 may contain a software interface, which enables user adjustment of inspection parameters of all relevant subsystems mentioned previously. In various embodiments, controller 105 may contain a PC to host all software tools as well as hardware components. In various embodiments, controller 105 may be configured as a central network element or hub to access various systems and components of system 100. Controller 105 may comprise a network, computer-based system, and/or software components configured to provide an access point to various systems and components of system 100.

In various embodiments, controller 105 may be in electronic communication with the transducer 110. The transducer 110 may comprise an ultrasonic single-element transducer, a phased array transducer or the like. For example, the transducer 110 may be configured to convert a broad band excitation signal into an ultrasonic wave. The transducer 110 may be configured to produce an ultrasonic wave 120 into within the tank 101 filled with the fluid 102 and receive a return signal of the ultrasonic wave 120. The ultrasonic wave 120 may propagate within the component 130 along an approximately 45-degree path in shear wave mode at a specific depth in question of the component 130.

In various embodiments, the controller 105 may be programmed to control the position and excitation parameters of transducer 110. Although shown as controlling the transducer, in various embodiments, a controller 105 may be coupled to a robot/servomotor that is coupled to the component 130 and programmed to control the position of the component 130 while the transducer 110 remains stationary. In various embodiments, the transducer 110 may be moved automatically during operation.

Figure 10:
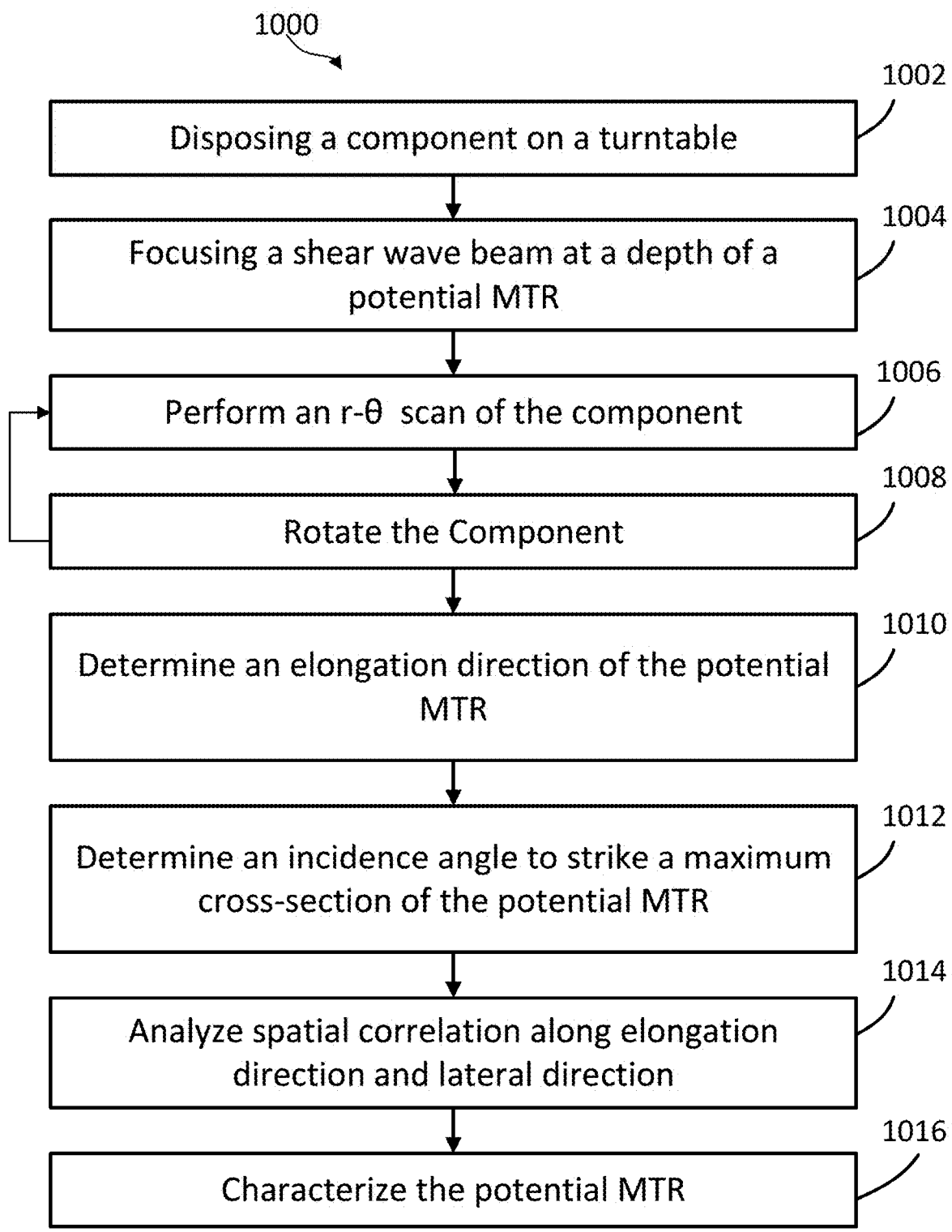
FIG. 10 illustrates a method of characterizing a potential MTR, in accordance with various embodiments.

Referring now to FIG. 10, a method of characterizing a potential MTR 1000, in accordance with various embodiments, is illustrated. With combined reference to FIGS. 9 and 10, the method 1000 comprises disposing a component 130 on a turntable 940 (step 1002). The component 130 may be disposed in a manner where the potential MTR location (i.e., the area of interest P) is aligned with an axis of rotation (Z-axis) of the turntable 940). In various embodiments, the component 130 may be disposed in a manner where the potential MTR location is offset from the axis of rotation. When the potential MTR is aligned with the axis of rotation, the scanning of the transducer 110 may intersect the potential MTR location for scanning at each angle during an R–θ scan in a subsequent step.

The method 1000 may further comprise focusing a shear wave beam at a depth of the potential MTR (step 1004). The method 1000 may further comprise performing a scan of the component 130 (step 1006). The scanning may be performed in accordance with the system 900 from FIG. 9. The component may comprise a rotor 500, or any other gas-turbine engine component. The scanning may be performed by an ultrasonic transducer, or the like. The method 1000 may further comprise rotating the component step 1008 by an angle, θ (step 1008). Steps 1006 and 1008 may be repeated until a 360 degree scan of the component from a radial distance from the axis of rotation is completed. In this regard, a raster scan having polar coordinates may be created from the scanning. The backscattered signals may be analyzed for each angle of the raster scan at the potential MTR location (e.g., area of interest P, which may be located at the axis of rotation, or where the radius is equal to approximately zero).

From the polar coordinate raster scan, an elongation direction of the potential MTR may be determined (step 1010). An "elongation direction" direction, as defined herein, refers to a longitudinal direction of the potential MTR, where the longitudinal direction is greater than lateral directions of the potential MTR. In this regard, one direction of an MTR is often longer than two other perpendicular directions to the MTR. The longest direction may be defined as the "elongation direction." The elongation direction may be dictated by metal flow during forging of the component 130, or the like. Backscattered signals from a potential MTR may be largest when the greatest cross-section of a potential MTR is perpendicular to an incident sound beam from the transducer 110.

Figure 11:
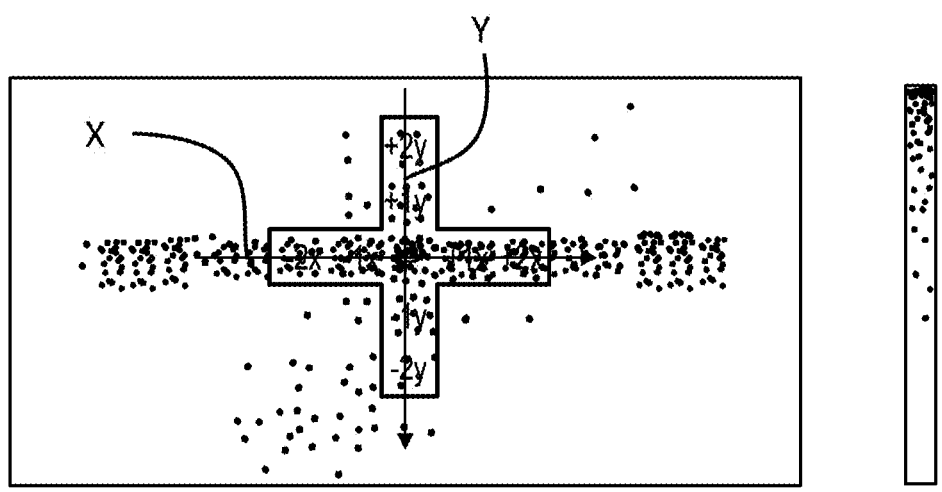
FIG. 11 illustrates a raster scan of a potential MTR at area of interest, in accordance with various embodiments.

The method 1000 may further comprise determining an incidence angle to strike a maximum cross-section of the potential MTR (step 1012) and analyzing spatial correlation of ultrasonic backscattered signals along the elongation direction of the potential MTR, the lateral direction of the potential MTR, and a reference position away from the potential MTR (step 1014). With brief reference to FIG. 11, a raster scan of a potential MTR at area of interest P is illustrated, in accordance with various embodiments. The potential MTR may comprise an elongation direction X and a lateral direction Y, wherein the lateral direction Y is perpendicular to the elongation direction X, backscattered signals from the X-Y cross-section of the potential MTR is the greatest compared with those created from other cross-sections, and the maximum amplitude of backscattered signal is recorded at the position P within the potential MTR. In case of a normal incidence to the X-Y cross-section is not achievable due to limited access angles, an 'optimized' incidence direction, which is perpendicular to the elongation direction and yields the greatest possible reflection could be deployed. Each reference point in FIG. 11 may include a signal voltage-versus-time waveform V(t, y) and V(t, y') measured from the transducer 110 from the system 100 in FIG. 1. A spatial correlation coefficient may be defined in a given direction (e.g., elongation direction X or lateral direction Y) by the function $$SCC(y-y') = \frac{\int V(t,y) \times V(t,y')}{\sqrt{\int [V(t,y)]^2 \times \int [V(t,y')]^2}},$$

where the numerator is the covariance of two waveforms V(t, y) and V(t, y'), the denominator is a signal energy term used to limit the maximum value of SCC to one. When a signal voltage-versus time waveform V(t, y) completely overlaps with voltage-versus time waveform V(t, y'), the spatial correlation coefficient will equal one. When there is no correlation between a signal voltage versus time waveform V(t, y) and V(t, y') the spatial correlation coefficient will equal zero. When there is some overlap between V(t, y) and V(t, y') the spatial correlation coefficient will be between zero and one.

Figure 12:
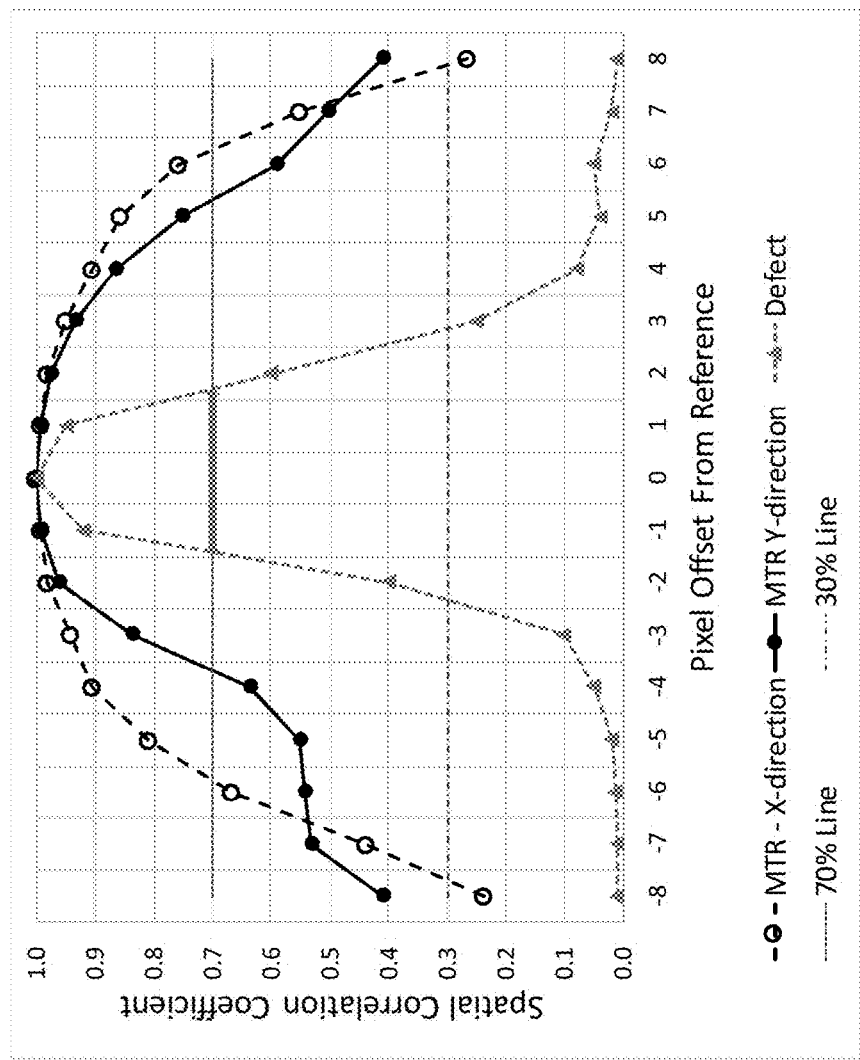
FIG. 12 illustrates a plot of spatial correlation coefficient as a function of pixel offset from an area of interest and definition of 3 dB width of a spatial correlation coefficient profile, in accordance with various embodiments.

A 3 dB width of a spatial correlation coefficient profile may be calculated on a reference point (e.g., area of interest P from FIGS. 9 and 11) and positions in close relation to the reference point, such as along an elongation direction of the area of interest, with reference to FIG. 12, a 3 dB width of spatial correlation coefficient of positions in close relation to the reference point along the elongation direction X and/or the lateral direction Y may be larger when the potential MTR is an actual MTR relative to when the potential MTR is a defect or a crack, when both generate backscattered ultrasonic signals with same or close amplitudes. In this regard, a potential MTR may be characterized as an actual MTR or a defect in response to analyzing a 3 dB width of spatial correlation coefficient of the elongation direction of the potential MTR.

Similarly, a spatial correlation coefficient slope between the reference point (e.g., area of interest P from FIGS. 9 and 11) and positions in close relation to the reference point along the elongation direction X and/or the lateral direction Y may be smaller when the potential MTR is an actual MTR relative to when the potential MTR is a defect or a crack, when both generate backscattered ultrasonic signals with same or close amplitudes. For example, with reference to FIG. 12, spatial correlation coefficients are plotted as a function of pixel offset from a reference point (e.g., area of interest P). In various embodiments, plot X corresponds to an elongation direction when the area of interest P is an actual MTR. In various embodiments, plot Y corresponds to a lateral direction when the area of interest P is an actual MTR. In various embodiments, the defect plot corresponds to an elongation direction or a lateral direction when the area of interest P is a defect. Referring back to FIG. 10, the method 1000 may further comprise characterizing the potential MTR in response to analyzing the spatial correlation along the elongation direction and the lateral direction (step 1016). In this regard, a plurality of actual MTR's may be analyzed for spatial correlations relative to position. A normal distribution of 3 dB width of spatial correlation coefficient relative to position from an actual MTR, and/or a spatial correlation coefficient slope from a reference point to an adjacent point in the elongation direction or lateral direction may be created. From a large sample of actual MTRs, a threshold 3 dB width of spatial correlation coefficient, and/or a threshold spatial correlation coefficient slope for an adjacent point to a reference point (e.g., area of interest P in FIGS. 9 and 11) may be determined for an actual MTR. In many cases, a particular set of threshold 3 dB width of spatial correlation coefficient and the threshold spatial correlation slope may be tied to a specific amplitude level of backscattered ultrasonic signal from the reference point under a specific inspection setup. Once the threshold slope and/or threshold 3 dB width of spatial correlation coefficient are determined, the threshold slope and/or threshold 3 dB width of spatial correlation coefficient may be utilized to characterize a potential MTR as an actual MTR or a defect. From this determination, a component (e.g., component 130 from FIGS. 1 and 9), may be scrapped or used in production. For example, in various embodiments, a potential MTR may be used for production if it is determined it is an actual MTR, whereas it may be scrapped if it is determined that the potential MTR is a crack or a defect. Alternatively, in various embodiments, a potential MTR may be used for production if it is determined it is an actual acceptable MTR, whereas it may be scrapped if it is determined that the potential MTR is an actual rejectable MTR. As such, in various embodiments, method 1000 may provide components (e.g., component 130) for production with a longer life span than typical components that don't utilize method 1000 for potential MTR characterization.

Figure 13:
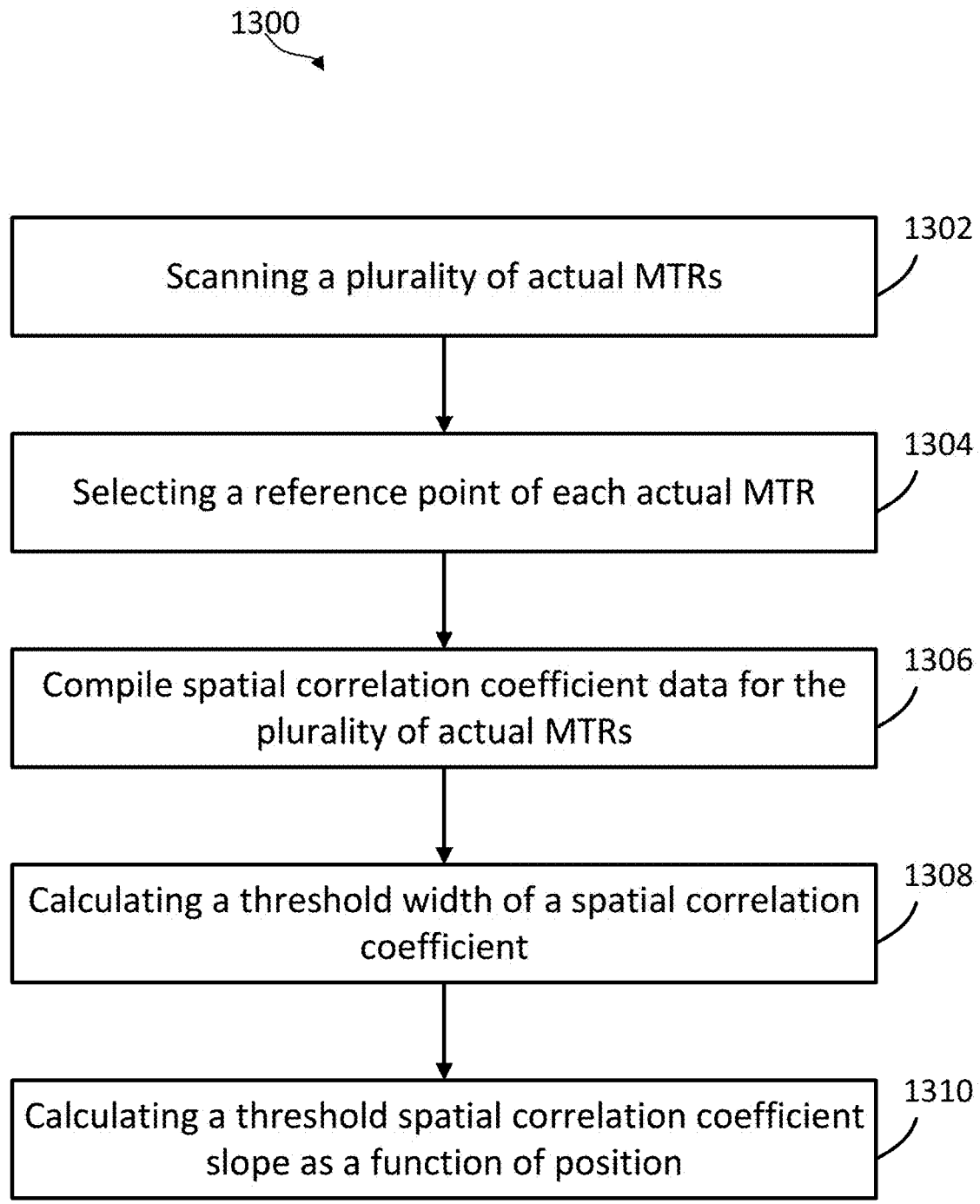
FIG. 13 illustrates a method of determining a threshold spatial correlation coefficient and/or a threshold spatial correlation coefficient slope, in accordance with various embodiments.

Referring now to FIG. 13, a method 1300 of characterizing an actual MTR is illustrated, in accordance with various embodiments. The method may comprise scanning a plurality of actual MTRs (step 1302). The plurality of actual MTRs may be scanned in accordance with systems 100, 900. The method 1300 may further comprise selecting a reference point of each actual MTR (step 1304). In various embodiments, the reference point may be an area of interest where the amplitude measure by the transducer (e.g., transducer 110 from FIGS. 1 and 9) is a maximum for the actual MPR.

In various embodiments, the method 1300 may further comprise compiling spatial correlation coefficient data for the plurality of actual MTRs relative to the reference point (step 1306). In this regard, a normal distribution of 3 dB width of spatial correlation coefficient vs. position and/or spatial correlation slope vs. position relative to a reference point may be determined. From the spatial correlation coefficient data for the plurality of actual MTRs, the method 1300 may further comprise calculating a threshold 3 dB width of spatial correlation coefficient based on a distance from the reference point (step 1308) and/or calculating a threshold spatial correlation coefficient slope based on a distance from the reference point (step 1310) for an actual MTR. These threshold values may be utilized in method 1000 to characterize a potential MTR as an actual MTR or a defect.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   scanning a batch of components with an ultrasonic transducer to form a scanned data set for each of the batch of components;
   determining a microtexture level indicator for each of a plurality of regions for each of the batch of components based on the scanned data set for each of the batch of components;
   separating a portion of the batch of components in response to each of the portion of the batch of components including one or more potential microtexture regions (MTRs) from the batch of components, wherein each of the one or more potential MTRs is determined based on the microtexture level indicator, each of the one or more potential MTRs including an area of interest;
   analyzing a spatial correlation coefficient profile of each of the one or more potential MTRs along an elongation direction relative to the area of interest;
   characterizing each of the one or more potential MTRs for each of the portion of the batch of components as an actual MTR, a rejectable MTR, or a defect; and
   scrapping a component of the portion of the batch of components in response to at least one of the one or more potential MTRs of the component being characterized as the defect or the rejectable MTR.

2. The method of claim 1, wherein the microtexture level indicator comprises at least one of an average peak factor, a standard deviation of peak amplitudes, and a baseband bandwidth.

3. The method of claim 1, wherein each of the one or more potential MTRs is determined by calculating the microtexture level indicator or possessing at least one of a rejectable indication or a marginally rejectable indication that resulted from an ultrasonic crack inspection.

4. The method of claim 3, wherein each of the one or more potential MTRs is determined in response to at least one of a high amplitude spot in an area with MTR content as identified by the microtexture level indicator, the rejectable indication, or the marginally rejectable indication as defined by comparing a maximum amplitude at the potential MTR to an established threshold amplitude in the ultrasonic crack inspection.

5. The method of claim 1, wherein analyzing the spatial correlation coefficient profile for each of the one or more potential MTRs further comprises comparing a width of spatial correlation coefficient of the area of interest with a threshold width of spatial correlation coefficient for the potential MTR to be characterized as the actual MTR.

6. The method of claim 1, wherein analyzing the spatial correlation coefficient profile for each of the one or more potential MTRs further comprises comparing a spatial correlation coefficient slope from the area of interest to an adjacent position with a threshold spatial correlation coefficient slope for the potential MTR to be characterized as the actual MTR, and wherein analyzing the spatial correlation coefficient profile further comprises comparing a width of spatial correlation coefficient of the potential MTR with a second threshold width of spatial correlation coefficient for the actual MTR to be characterized as an acceptable MTR.

* * * * *